United States Patent [19]

Ishikawa

[11] Patent Number: 5,729,664
[45] Date of Patent: Mar. 17, 1998

[54] IMAGE PROCESSING APPARATUS AND METHOD FOR CONVERTING AN INPUT COLOR IMAGE SIGNAL FROM ONE COLOR SPACE TO ANOTHER

[75] Inventor: Hiroshi Ishikawa, Kanagawa, Japan

[73] Assignee: Fuji Xerox Co., Ltd., Tokyo, Japan

[21] Appl. No.: 510,968

[22] Filed: Aug. 3, 1995

[30] Foreign Application Priority Data

Aug. 12, 1994 [JP] Japan .................................. 6-212108

[51] Int. Cl.$^6$ .................................................. G06K 15/00

[52] U.S. Cl. ........................ 395/109; 358/518; 358/523; 358/501

[58] Field of Search ........................ 395/109, 101, 395/115; 358/518, 523–525, 515, 501, 409; 382/167, 162

[56] References Cited

U.S. PATENT DOCUMENTS

| 4,796,095 | 1/1989 | Shimada ........................ 358/285 |
| 4,887,150 | 12/1989 | Chiba et al. . |
| 5,029,019 | 7/1991 | Yoshihara et al. ................ 358/447 |
| 5,309,258 | 5/1994 | Kouno et al. .................... 358/523 |
| 5,319,395 | 6/1994 | Larky et al. ..................... 345/190 |
| 5,539,843 | 7/1996 | Murakami et al. ................ 382/270 |

FOREIGN PATENT DOCUMENTS

| 58-16180 | 3/1983 | Japan . |
| 2-87192 | 3/1990 | Japan . |
| 4-181871 | 6/1992 | Japan . |

OTHER PUBLICATIONS

T. Fumoto et al, "A High–Speed Color Processor by 3–D LUT and SLANT–PRISM Interpolation", The 24th Image Engineering Conference Papers, pp. 347–350 (1993).

*Primary Examiner*—Dwayne Bost
*Assistant Examiner*—Tracy M. Legree
*Attorney, Agent, or Firm*—Finnegan, Henderson, Farabow, Garrett & Dunner, L.L.P.

[57] ABSTRACT

During a first period of a conversion clock signal DL, a 3-dimensional DLUT color convertor 10 converts an RGB input color image signal of one pixel that is outputted from a input register 42, into an output color image data of yellow on the basis of conversion data from a conversion table 20. During the next period, the 3-dimensional DLUT color convertor 10 converts the RGB color image signal of one pixel into an output color image data of magenta on the basis of another conversion data. The 3-dimensional DLUT color convertor 10 likewise converts the RGB color image signal into output color image data of cyan and black in a time divisional manner. Accordingly, it is possible to convert an input color image signal of a color space into an output color image signal of another color space in real time, by one color converting means.

10 Claims, 10 Drawing Sheets

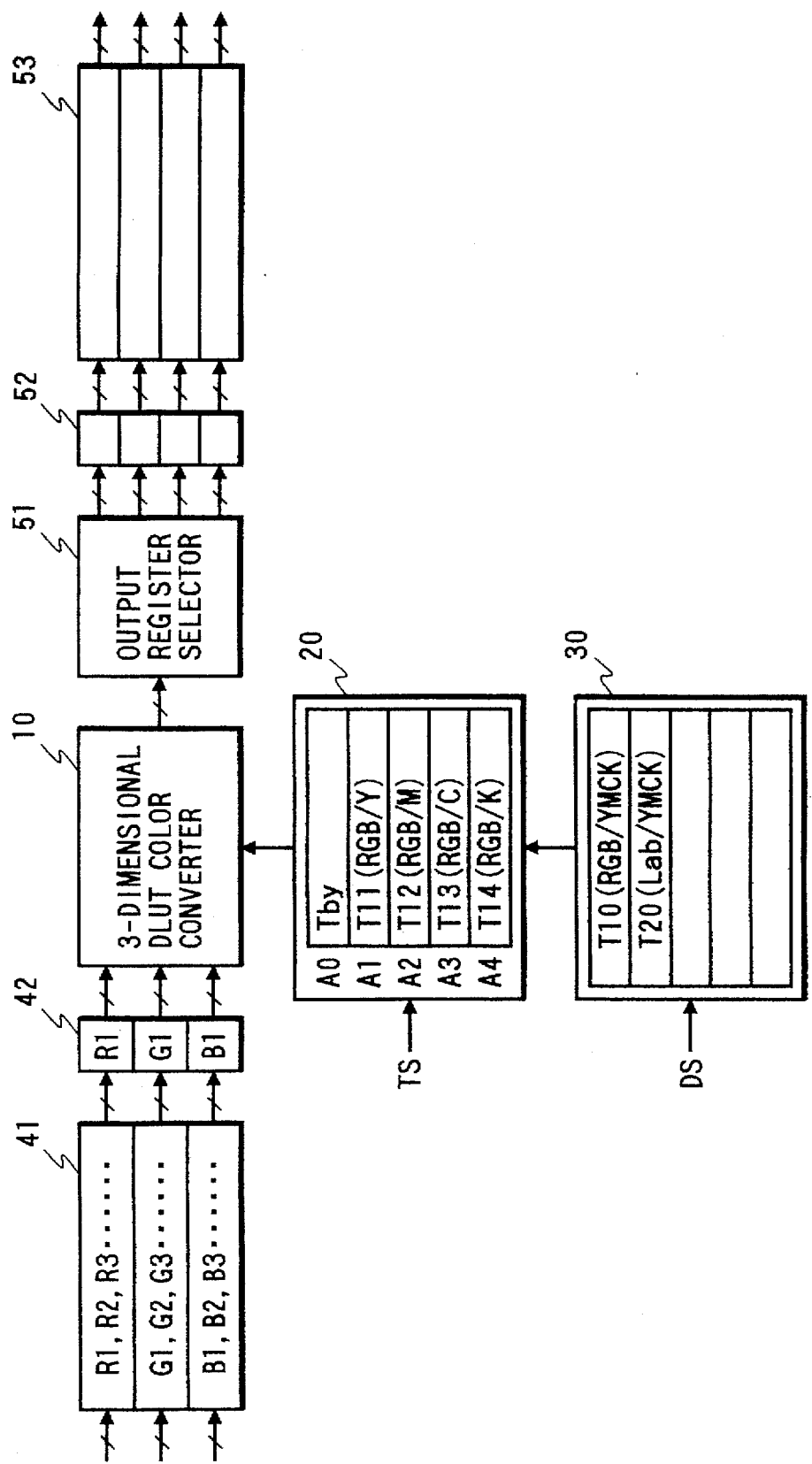

IMAGE PROCESSING APPARATUS AND METHOD FOR CONVERTING AN INPUT COLOR IMAGE SIGNAL FROM ONE COLOR SPACE TO ANOTHER

BACKGROUND OF THE INVENTION

The present invention relates to an image processing apparatus, which is used for a color copying machine, a color printer, or the like, for converting an input color image signal of one color space into an output color image signal of another color space, and outputting the converted color image signal.

A called color conversion process which converts an input color image signal of a color space into an output color image signal of another color space, and outputs the converted color image signal, is carried out in a color copying machine, a color printer, or the like.

In a color copying machine, for example, an image reader as an input unit optically reads a color image out of an original color document. Through the image reading operation, the gathered optical color image information is transformed into a color image signal defined by an RGB color space, viz., an RGB color image signal. An image printing device as an output unit converts the RGB input color image signal into a YMCK output color image signal since the colors of the coloring materials, such as toner and ink, are yellow, magenta, cyan, and black.

In a color printer, a color image signal from a computer, for example, is a color image signal containing the color components of a specific color space, usually an RGB color space used in the color television system. The coloring materials used for the printing are toner or ink, and the colors of them are yellow, magenta and cyan. For this reason, an image data processor of the color printer converts a RGB color image signal into a YMCK output color image signal.

For the color conversion process, a matrix computing unit of approximately 3×3 was conventionally used. The computing unit can be realized by an LSI of the circuit scale of about 10,000 gates. However, the color reproduction performance of such LSI computing unit is not satisfactory. For this reason, it is substituted by an LUT (look up table) in recent days.

A conventional image processing apparatus for color conversion is shown in FIG. 12. To convert an RGB color image signal into a YMCK output color image signal in real time, conversion data for converting the color components data of red, green and blue in the input color image signal into the color components data of yellow, magenta, cyan and black in the YMCK output color image signal are stored in 3-dimensional DLUT (direct lookup table) color convertors 1Y, 1M, 1C and 1K. On the basis of the conversion data, the 3-dimensional DLUT color convertors 1Y, 1M, 1C and 1K produce YMCK output color image signals, respectively.

To store, as the conversion data, the values of the color components of yellow, magenta, cyan and black, which are related to the values of the red, green and blue color component data in one-to-one correspondence, the 3-dimensional DLUT color convertors 1Y, 1M, 1C and 1K must have tremendously large memory capacities.

To cope with this, data base for interpolation calculation or calculation coefficients are used for the color conversion data. The interpolations available for the color data conversion are, for example, a triangular prism interpolation, an oblique triangular prism interpolation, a solid interpolation, and a tetrahedral interpolation. For the details of this technique, reference is made to "The 1993, 24th Image Engineering Conference Papers" pp347 to 350, Published Unexamined Japanese Patent Application No. Sho. 58-16180, and Published Unexamined Japanese Patent Application No. Hei. 2-87192. The 3-dimensional DLUT color convertors 1Y, 1M, 1C and 1K produce the color component data of yellow, magenta, cyan and black by the interpolation calculations by any of the interpolations.

The conventional image processing apparatus requires, for color conversion, three 3-dimensional DLUT color convertors as color converting means in order to convert an RGB color image signal into a YMC output color image signal in real time. To convert an RGB color image signal into a YMCK output color image signal in real time as shown in FIG. 12, four 3-dimensional DLUT color convertors are required as color converting means. Accordingly, a circuit scale of the color conversion portion in the image processing apparatus is large.

Recently, the input/output media of color images becomes diversified, and are interchanged by way of a communication network. For this background reason, the application software for editing color image information, which are capable of handling many color signals, come out in the market.

In this case, to obtain print output color image signals representative of yellow, magenta, cyan, and black for printing on the basis of input color image signals of various types of color spaces, e.g., a RGB color space, a Lab color space, and an HSB color space, it is necessary to convert, in real time, input color image signals of various types of color spaces into a YMC color image signal or a YMCK output color image signal. To this end, a plural number of color conversion systems as shown in FIG. 12, each consisting of a plural number of 3-dimensional DLUT color convertors, are arranged in parallel. These color conversion systems must be selectively switched in accordance with the type of the color space of an input color image signal used. As a result, the color conversion section of the image processing apparatus is large in circuit scale.

SUMMARY OF THE INVENTION

Accordingly, an object of the present invention is to provide an image processing apparatus which enables a single color converting means to convert an input color image signal of a color space into an output color image signal of another color space in real time, and to convert input color image signals of many color into output color image signals of other color spaces also in real time.

According to the invention, an image processing apparatus which converts an input color image signal of a color space into an output color image signal of another color space, and outputs the converted color image signal, comprises a conversion table for storing conversion data for converting input color image signal into the color component data of the output color image signal, the color conversion data being generated for each color component of the output color image signal; conversion data select means for repeatedly selecting one from among those conversion data corresponding to the color components of the output color image signal and reading the selected one from the conversion table in successive order; and color conversion means for converting the input color image signal into the output color image signal on the basis of the conversion data selected by the conversion data select means.

According to the invention, the image processing apparatus further comprises data holding means for holding the unit quantity of the data of the input color image signal till the unit quantity of the data of the input color image signal is converted into the unit quantity of the color component data of the output color image signal.

Furthermore, according to the invention, the image processing apparatus further comprises conversion data storage means for storing the conversion data that depend on the type of the color space of the input color image signal; and recognizing/select means for discriminatively recognizing the type of the color space of the input color image signal, selecting the conversion data corresponding to the recognized type of the color space of the input color image signal from among those conversion data stored in the conversion data storage means, and transferring the conversion data to the conversion table.

Moreover, in the image processing apparatus, the conversion table or the conversion data storage means stores data Tby which causes the input color image signal to be outputted as an output color image signal without color conversion, and the conversion data as well.

Still further, according to the invention, an image processing apparatus for converting an input color image signal containing a plural number of color components, which define a first color space into an output color image signal containing a plural number of other color components, which define a second color space, the image processing apparatus comprises: (a) reference clock generating means for generating a reference clock signal to transfer the input color image signal and the output color image signal pixel by pixel; (b) conversion clock generating means for generating a conversion clock signal, which is synchronized with the reference clock signal and has a frequency as the result of multiplying the frequency of the reference clock signal by the number of the color components of the second color space; (c) an input memory for storing a plural number of pixels of the input color image signal in synchronism with the reference clock signal; (d) a register for storing, in synchronism with the reference clock signal, each of the color components of the first color space, which are contained in a signal of one pixel of the input color image signal that is stored in the input memory; (e) a conversion table for storing a plural number of conversion data used for converting the input color image signal into the color components of the output color image signal; (f) means for selecting, every conversion clock signal, specific conversion data from among the conversion data stored in the conversion table on the basis of the first color space of the input color image signal that is stored in the register and the color component of the output color image signal; (g) color conversion means for converting, every conversion clock signal, each of the color components of the first color space that are stored in the register into one color component of the second color space, on the basis of the selected conversion data; and (h) an output memory for storing the converted output color image signal outputted from the color conversion means in synchronism with the reference clock signal.

In the thus constructed image processing apparatus of the invention, conversion data, which correspond to the color components of the output color image signal, are successively selected from among those color components stored in the conversion table and transferred to the color conversion means at periods each 1/(N·fr). Here, 1/fr represents the transfer period of the unit quantity of color image data of the input/output color image signal, and N indicates the number of color components of the output color image signal from the color conversion means. Accordingly, the color conversion means 10 successively converts the input color image signal into the color components of the output color image signal at the period of 1/(N·fr) in a time divisional manner. As a result, one color conversion means converts an input color image signal of a color space into an output color image signal of another color space in real time, viz., synchronously with the input and output timings of the color image signal.

In the image processing apparatus, the unit quantity of the data of the input color image signal is held by the data holding means till the unit quantity of the data of the input color image signal is converted into the unit quantity of the color component data of the output color image signal. Therefore, there is no need of such an operation that every time the unit quantity of the data of the input color image signal is converted into the unit quantity of the color component data of the output color image signal of one pixel, the unit quantity of the same data of the input color image signal is transferred from the input buffer memory which stores the input color image signal, to the color conversion means.

In the image processing apparatus, the conversion data that depend on the type of the color space of the input color image signal is selectively picked up from the conversion data storage means, and transferred to the conversion table. And the conversion data that correspond to the color components of the output color image signal are successively transferred from the conversion table to the color conversion means. Therefore, the color conversion means may be used common to the input color image signals of various types of color spaces. It successively converts an input color image signal into the color components data of an output color image signal in time divisional manner. One color conversion means converts an input color image signal of a color space into an output color image signal of another color space in real time, viz., synchronously with the input and output timings of the color image signal.

The image processing apparatus operates as follows. There is a case where the color space of an input color image signal is equal to the color space of the color image signal to be outputted or where a color image signal of a color space to be outputted is contained in an input color image signal. In this case, the data Tby, which causes the input color image signal to be outputted as an output color image signal without the color conversion process, is selectively picked up from the conversion table, and transferred to the color conversion means. Alternatively, it is selectively picked up from the conversion data storage means, transferred to the conversion table, and to the color conversion means. As a result, the input color image signal is directly outputted from the color conversion means while not being color converted in real time, viz., synchronously with the input and output timings of the color image signal.

In the image processing apparatus, the frequency of the conversion clock signal is the result of multiplying the frequency of the reference clock signal by the number of the color components of the second color space. Further, the data of the register is converted, every conversion clock signal, into the color components of the output color image signal while the input color image signal of one pixel is successively stored into the register in synchronism with the reference clock signal. Therefore, by using one look-up table, the color conversion can be carried out in real time, viz., synchronously with the input and output timings of the color image signal.

Further, the color components of the output color image signal are formed for the same color image signal of one pixel that is stored in the register, on the basis of various conversion data. The number of operations of loading image data into the register is remarkably reduced, when comparing with the case where the data of several pixels are successively stored in the register for one conversion data, and one color component of the output color image signal is formed successively for several pixels. Therefore, even in such a case where a long time is taken for the image data to be loaded into the register, the time of the whole color conversion process can be relatively reduced.

Further, the output color image signal of which the color conversion is completed can be produced in successive order. Therefore, the output color image signal processed for color conversion can be outputted every pixel to an output device, if it is coupled with the output device.

BRIEF DESCRIPTION OF DRAWINGS

FIG. 6 is a block diagram useful in explaining the operation of the image processing apparatus of FIG. 1;

DETAILED DESCRIPTION OF PREFERRED EMBODIMENTS

Figure 1:
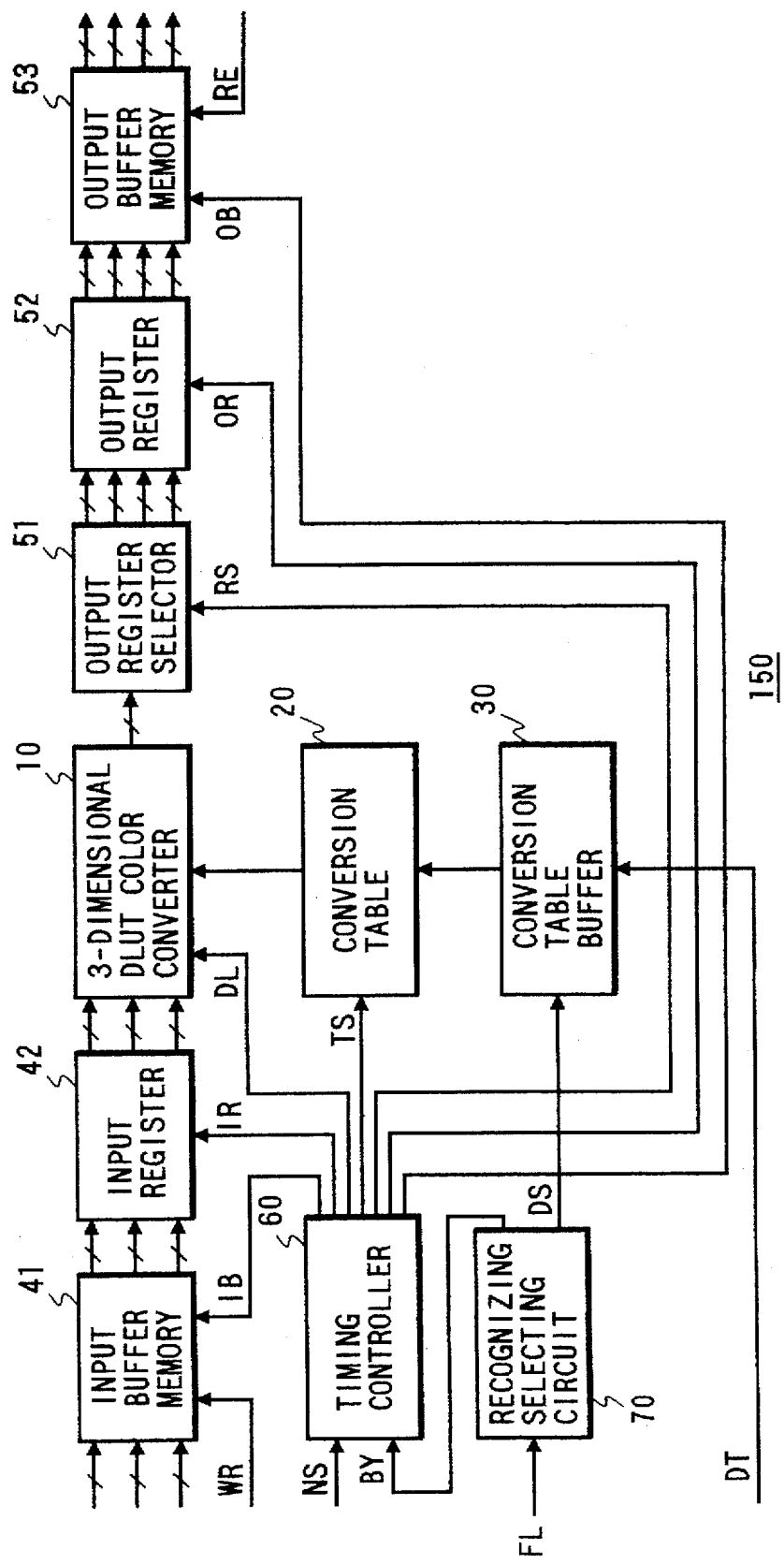
FIG. 1 is a block diagram showing an embodiment of an image processing apparatus according to the present invention.
Figure 2:
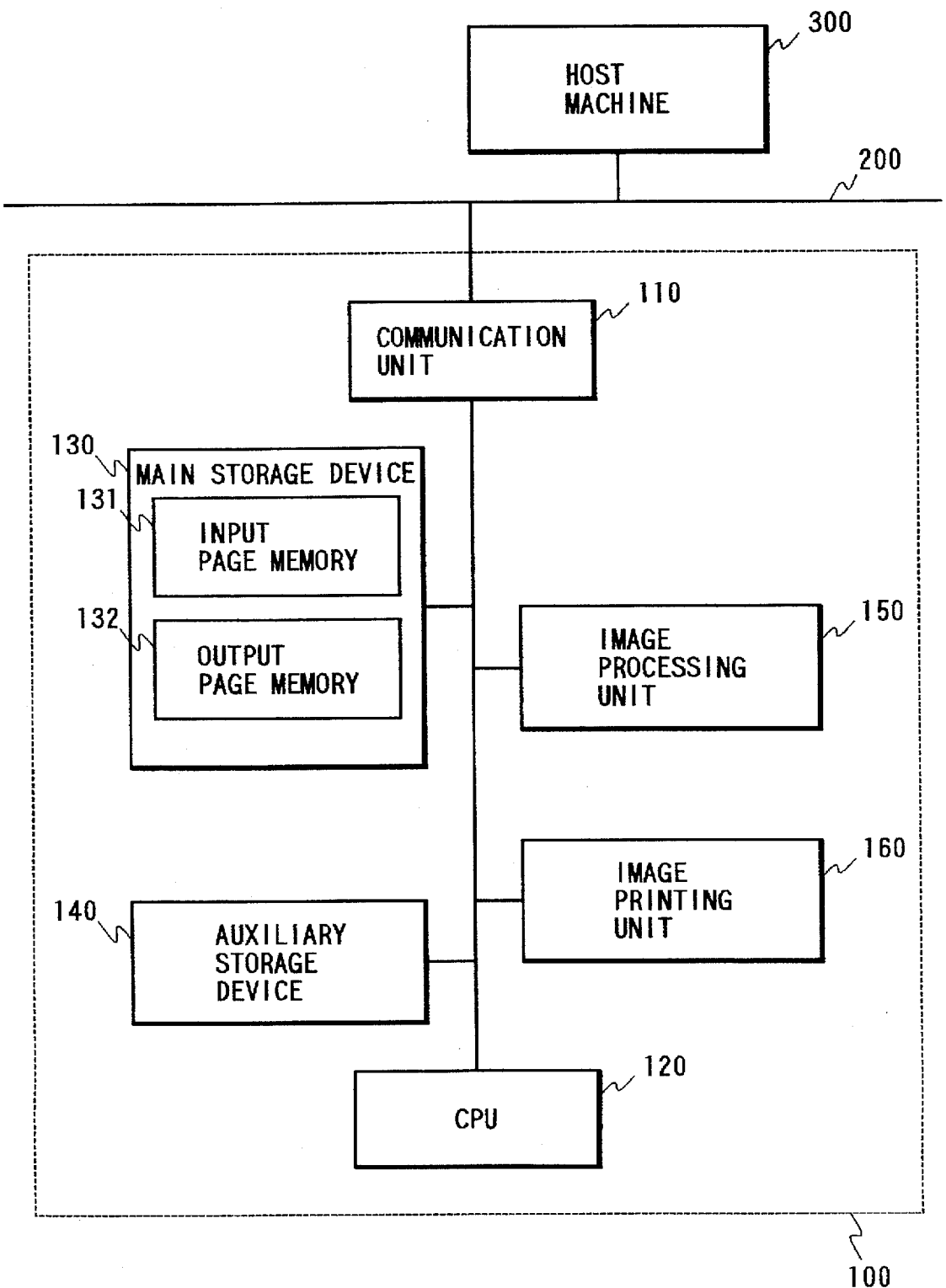
FIG. 2 is a block diagram showing a printer system into which the image processing apparatus of FIG. 1 is incorporated.

FIG. 1 is a block diagram showing an embodiment of an image processing apparatus according to the present invention. FIG. 2 is a block diagram showing a printer system into which the image processing apparatus of FIG. 1 is incorporated.

The printer system is arranged such that a color printer 100 is connected to a host machine 300, such as a computer or a work station, by way of a network 200. The color printer 100 receives an image print instruction from the host apparatus 300, and prints a color image.

The image print instruction outputted from the host apparatus 300 contains information indicative of the position and size of each of image portions to be printed in one page, and a color space of the image portion, and an input color image signal of the image portion. Namely, the image print instruction includes the information indicative of the color space of the input color image signal for each picture element (pixel).

The color printer 100 is made up of a communication unit 110, a CPU 120, a main storage device 130, an auxiliary storage device 140, an image processing unit 150 as an example of the image processing apparatus of the present invention, and an image printing device 160. The communication unit 110 receives an image print instruction from the host apparatus 300, and the CPU 120 analyzes and properly processes the image print instruction, and produces an input color image signal of one page.

The main storage device 130 includes an input page memory 131 and an output page memory 132. The input page memory 131 stores an input color image signal of one page outputted from the CPU 120 and flags respectively attached to pixels of the input color image signal. The flags are each indicative of the type of a color space of each pixel of the input color image signal. In this case, the input color image signal of one page is stored into the input page memory 131 in a state that it is developed into a two-dimensional array.

The output page memory 132 stores two types of an output color image signal. The image processing unit 150 reads the input color image signal from the input page memory 131, and processes it for color conversion (to be described later). The result of carrying out the color conversion process by the image processing unit 150 is inputted as a first output color image signal to the output page memory 132 for the purpose of storage. The color image signal, not processed for color conversion by the image processing unit 150, is also inputted as a second output color image signal to the output page memory 132.

Input color image signals of various color spaces, such as an RGB color space, an Lab color space, and an HSB color space, are converted into color components data of the output color image signal in a color space of print colors for the image printing device 160. Data for this color conversion is stored in the auxiliary storage device 140.

The color conversion data consists of data base for interpolating calculation or calculation coefficients. The interpolations available for the color data conversion are, for example, a triangular prism interpolation, an oblique triangular prism interpolation, a solid interpolation, and a tetrahedral interpolation.

The image processing unit 150 color converts the input color image signal outputted from the input page memory 131 of the main storage device 130 and produces an output color image signal. The image processing unit 150 produces an output color image signal, without color converting the input color image signal.

The image printing device 160 successively forms plates of given print colors from the output color image signal of the output page memory 132 of the main storage device 130, and prints a color image. In the present embodiment, the print colors of the image printing device 160 are yellow, magenta, cyan and black.

The image processing unit 150, as shown in FIG. 1, is made up of a 3-dimensional DLUT color convertor 10, a conversion table 20, a conversion table buffer 30, an input buffer memory 41, an input register 42, an output register selector 51, an output register 52, an output buffer memory 53, a timing controller 60, and a recognizing/select circuit 70.

The 3-dimensional DLUT color convertor 10 receives conversion data from the conversion table 20 and a conversion clock signal DL from the timing controller 60 (as will be described later), and converts an input color image signal from the input register 42 into data of color components of the output color image signal in a time divisional manner. The colors of the color components are yellow, magenta, cyan, and black in this embodiment.

The conversion data for converting the input color image signal that is outputted from the data holding means 42, into the color components of the output color image signal are read out of the conversion data storage means 30, and stored into the conversion table 20. In this embodiment, in addition to the color conversion data, data which causes the input color image signal to be outputted as an output color image signal without the process of color conversion, is stored in advance in the conversion table 20, as will be described later.

The conversion table buffer 30 receives necessary conversion data DT from the auxiliary storage device 140 which stores various conversion data as already stated, and stores the conversion data DT therein.

The input buffer memory 41 receives an input color signal from the input page memory 131 of the main storage device 130, and stores it therein every line or every several lines when receiving a write control signal WR issued from the CPU 120. The input color image signal is transferred from the input buffer memory 41 every pixel to the input register 42 when the input buffer memory 41 receives a transfer clock signal IB from the timing controller 60.

The input register 42 receives the input color image signal from the input buffer memory 41, and latches the input color image signal of one pixel by a latch pulse IR from the timing controller 60.

The output register selector 51 receives the color components data of the output color image signal from the 3-dimensional DLUT color convertor 10 in a time divisional manner, and delivers the data to the address locations of the output register 52 when it receives a register select signal RS from the timing controller 60.

The output register 52 receives the output color image signal from the 3-dimensional DLUT color convertor 10 through the output register selector 51, and latches therein the output color image signal of one pixel when it receives a latch pulse OR from the timing controller 60.

The output buffer memory 53 stores therein the output color image signal from the output register 52 pixel by pixel by a transfer clock OB from the output register 52. Further, the output color image signal is transferred from the output buffer memory 53 every line or every several lines to the output page memory 132 of the main storage device 130, when the output buffer memory 53 receives a readout control signal RE from the CPU 120.

Figure 3:
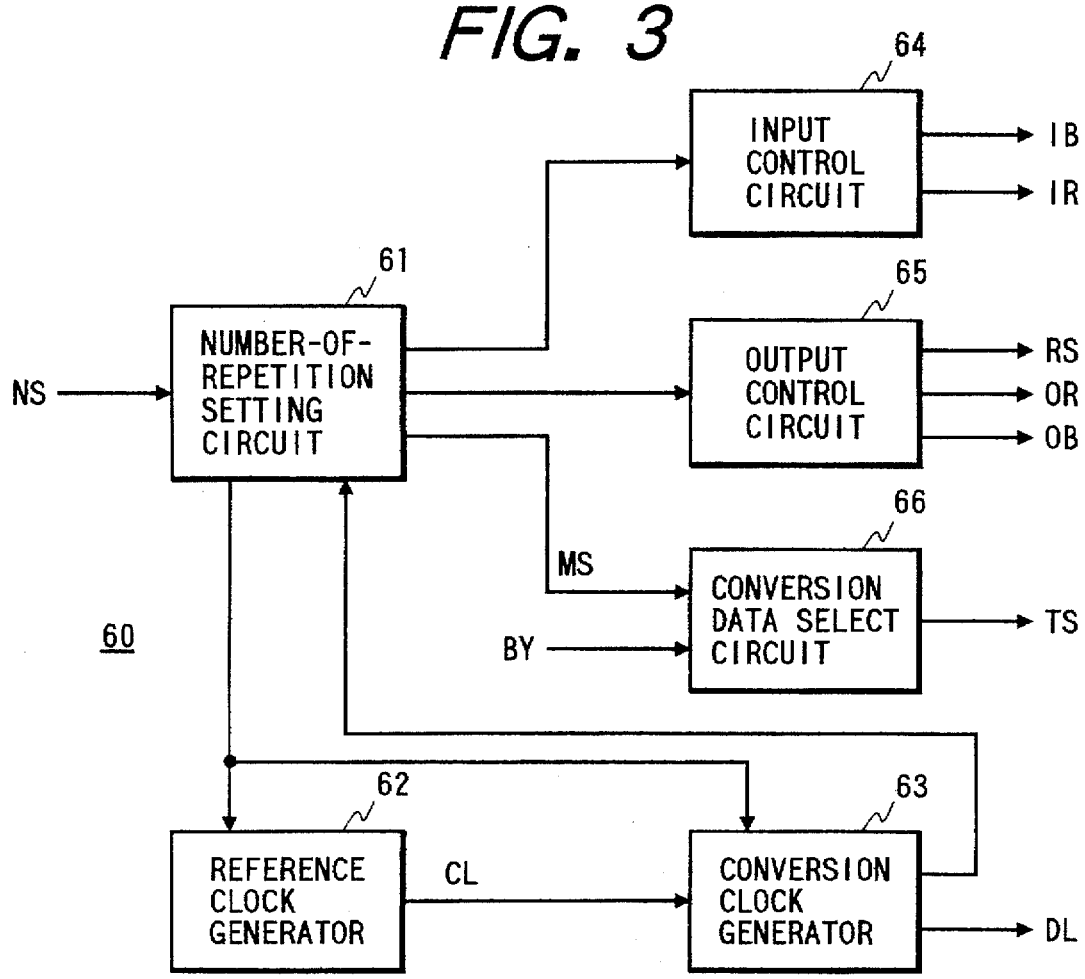
FIG. 3 is a block diagram showing a timing controller in the image processing apparatus of FIG. 1.

The timing controller 60, as shown in FIG. 3, is made up of a number-of-repetitions setting circuit 61, a reference clock generating circuit 62, a conversion clock generating circuit 63, an input control circuit 64, and a conversion data select circuit 66.

In the number-of-repetitions setting circuit 61, the number of the color components of the output color image signal, which is outputted from the 3-dimensional DLUT color convertor 10, is set as the number of repetitions of the color conversion in the 3-dimensional DLUT color convertor 10 by a setting signal NS from the CPU 120. In this embodiment, the 3-dimensional DLUT color convertor 10 produces the output color image signals of Y, M, C and K. Then, the number N of repetitions is set to "4".

Figure 4:
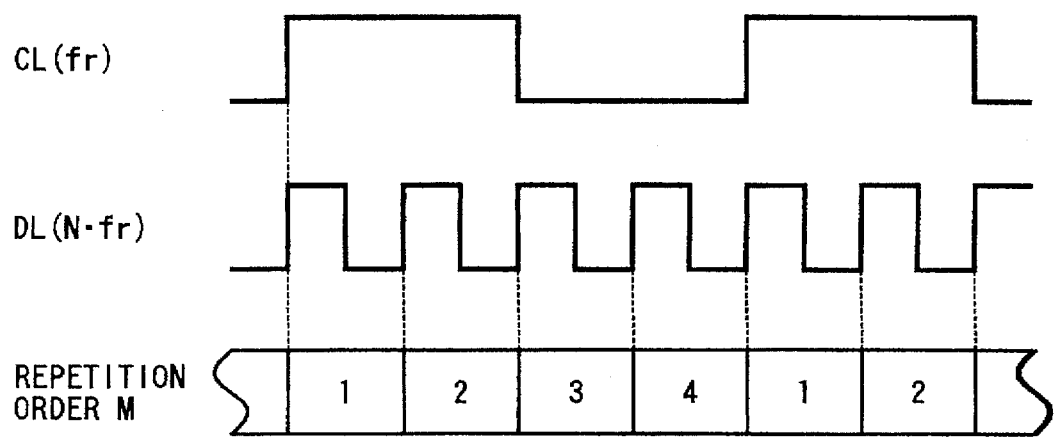
FIG. 4 is a time chart useful in explaining clock signals generated by the timing controller.

When the number N of repetitions is set in the number-of-repetitions setting circuit 61, the circuit 61 produces a signal for transmission to the reference clock generating circuit 62. In turn, the reference clock generating circuit 62 is driven to produce a reference clock signal CL at a given frequency fr as shown in FIG. 4.

The frequency fr of the reference clock signal CL or the period 1/fr thereof are the frequency or the period at which the input color image signal of one pixel is transferred from the input buffer memory 41 to the input register 42, and the output color image signal of one pixel is transferred from the output register 52 to the output buffer memory 53. Fr=8 MHz, for example.

When receiving the signal from the number-of-repetitions setting circuit 61, the conversion clock generating circuit 63 produces a conversion clock signal DL of which the frequency is N times as large as the frequency fr of the reference clock signal CL. The conversion clock signal DL is synchronized with the reference clock signal CL, as shown in FIG. 4. Since N=4 in this embodiment, the frequency of the conversion clock signal DL is four times as large as the reference clock signal CL, i.e., 32 MHz.

The conversion clock signal DL is applied to the 3-dimensional DLUT color convertor 10 where in turn the color conversion process is carried out every period. In this embodiment, the repetition order M 1, 2, 3 and 4 are assigned to four periods of the conversion clock signal DL within one period of the reference clock signal CL, as shown in FIG. 4. During the periods (M=1, 2, 3 and 4) of the conversion clock signal DL, the input color image signal of one pixel are successively converted into yellow, magenta, cyan, and black color components data of the output color image signal of one pixel.

Transfer clock signals IB and OB are synchronized with the conversion clock signal DL, and the frequency thereof is equal to that of the reference clock signal CL. The transfer clock signals IB and OB are respectively transferred to the input buffer memory 41 and the output buffer memory 53, as described above.

The latch pulse IR, transferred to the input register 42, is synchronized with the conversion clock signal DL, and the frequency thereof is equal to that of the reference clock signal CL. The latch pulse OR, transferred to the output register 52, is synchronized with the conversion clock signal DL, and the frequency thereof is equal to that of the conversion clock signal DL.

The register select signal RS is used for selecting the addresses of the output register 52 to which the color component data of the output color image signal from the 3-dimensional DLUT color convertor 10 are to be delivered in accordance with the repetition order M.

A signal MS indicative of the repetition order M is applied from the number-of-repetitions setting circuit 61 to the conversion data select circuit 66. When receiving this signal, the conversion data select circuit 66 produces a signal TS which specifies an address location in the conversion table 20 to read the conversion data out of the specified address location of the conversion table 20.

In this embodiment, the conversion table 20 contains five address locations A0, A1, A2, A3, and A4 as shown in FIG. 6. Data Tby is stored in the address location A0. The data Tby causes the input color image signal to be outputted as an output color image signal without color conversion.

In this embodiment, a signal BY, together with the signal MS, is applied to the conversion data select circuit 66. The signal BY indicates whether or not the input color image signal from the input register 42 is to be color converted. The signal BY is outputted from the recognizing/select circuit 70 (FIG. 1) as will be described later. Incidentally, the signal MS is indicative of the repetition order M. When the input color image signal from the input register 42 is to not be color converted, viz., it is a YMC color image signal in this embodiment, the signal TS specifies the address location A0 of the conversion table 20 to read the data Tby from the address location A0 of the conversion table 20.

The recognizing/select circuit 70 follows. Flags indicative of the types of the color spaces of the input color image signals, together with the input color image signal, are developed into the input page memory 131 of the main storage device 130, as already stated. The flag is read out of the input page memory 131, and transferred and latched by a means (not shown), which is similar to that for the input buffer memory 41 and the input register 42, to thereby form a flag FL. The flag FL indicates the type of a color space of the input color image signal outputted from the input register 42. The recognizing/select circuit 70 receives the flag FL, and discriminatively recognizes the type of a color space of the input color image signal outputted from the input register 42 pixel by pixel. On the basis of the result of the color space recognition, the recognizing/select circuit 70 produces a signal DS which specifies its related address location in the conversion table buffer 30 pixel by pixel and selects the conversion data corresponding to the color space of the input color image signal outputted from the input register 42.

The recognizing/select circuit 70 produces the signal BY which indicates whether or not the input color image signal from the input register 42 is to be color converted, viz., the input color image signal is a YMC color image signal in this embodiment, and applies it to the conversion data select circuit 66 of the timing controller 60 as described above.

Figure 5:
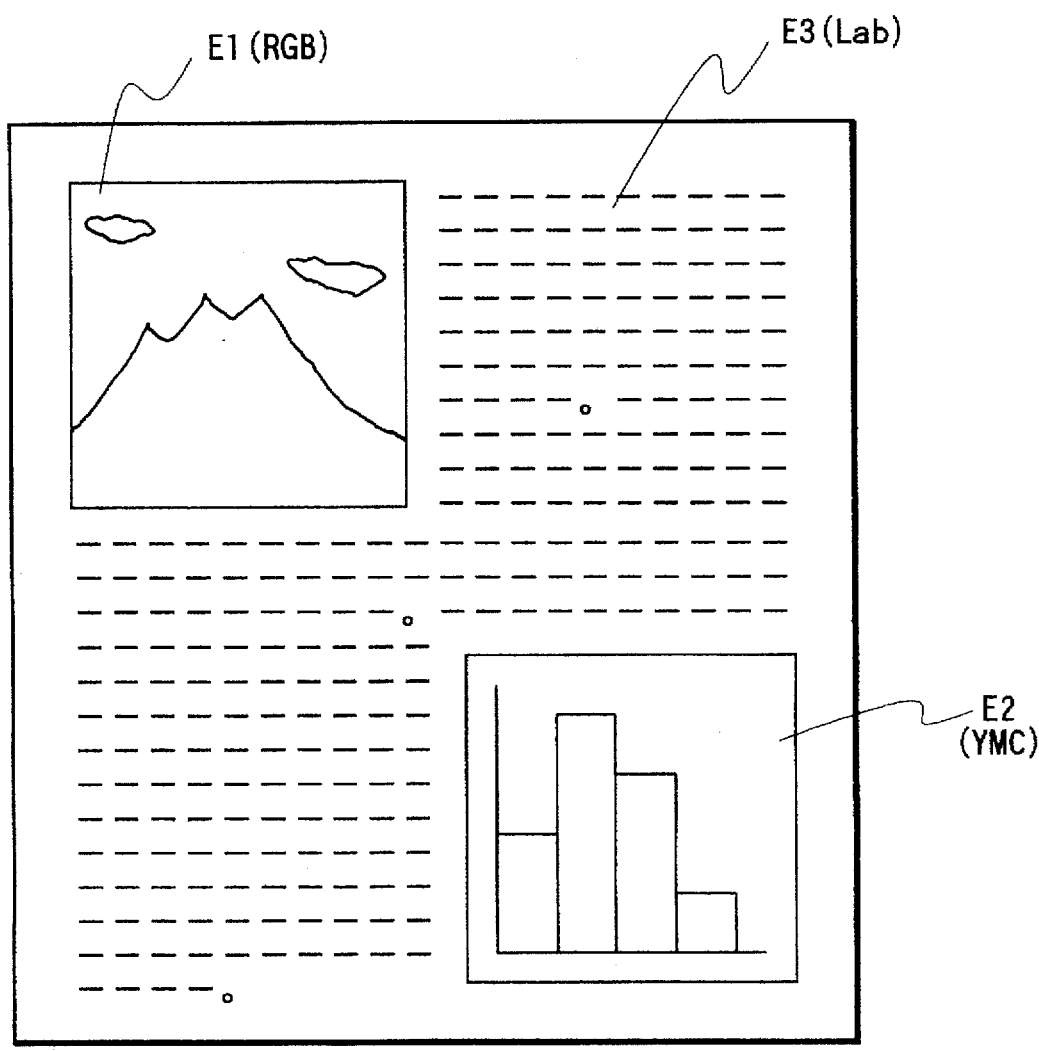
FIG. 5 is a diagram showing the layout of input color image data of one page.

The operation of the image processing unit 150 thus arranged will be described. The following case will be used for the operation description. Input color image signals of one page as shown in FIG. 5 are developed into the input page memory 131 of the main storage device 130 of the color printer 100, in accordance with the image print instruction from the host apparatus 300. The input color image signals stored are 1) an RGB color image signal for the upper left area E1 in the page, 2) a YMC color image signal for the lower right area E3, and 3) a Lab color image signal for the remaining area E3.

The input color image signal of one page and the flags indicative of the types of the color spaces of the input color image signal are developed into the input page memory 131. Immediately after the operation of storing the image data and the flags associated therewith, necessary conversion data DT are read out of the auxiliary storage device 140 which stores various types of conversion data. In this embodiment, the conversion data DS are conversion data T10 and T20, which are used for converting the RGB input color image signal and the Lab input color image signal into the color components data of the YMCK output color image signal. The conversion data T10 and T20 read out are stored into the conversion table buffer 30 as shown in FIG. 6.

The CPU 120 issues a setting signal NS to the number-of-repetitions setting circuit 61 of the timing controller 60. By this signal, "4" is set as the number N of repetitions in the number-of-repetitions setting circuit 61.

The data of the first line of the one-page input color image signal that is stored in the input page memory 131 of the main storage device 130 is loaded into the input buffer memory 41.

As seen from FIG. 5, the input color image signals of the first line consists of the RGB color image signal occupying the first half of the first line and the Lab color image signal occupying the second half thereof. A diagram of FIG. 6 shows a state that the input color image signals of the first line are loaded into the input buffer memory 41. R1, G1 and B1 represent red, green and blue input color image data of the first pixel; R2, G2 and B2 represent red, green and blue input color image data of the second pixel; and R3, G3 and B3 represent red, green and blue input color image data of the third pixel.

The input color image data R1, G1, and B1 of the first pixel are transferred from the input buffer memory 41 to the input register 42 when the input buffer memory 41 receives the transfer clock signal IB of the frequency fr. Then, the input color image data R1, G1, and B1 of the first pixel are latched in the high-order address, the medium-order address, and the lower-order address of the input register 42 when the input register 42 receives the latch pulse IR of the frequency fr, as shown in FIG. 6. Subsequently, the input color image data R1, G1, and B1 thus latched are inputted to the 3-dimensional DLUT color convertor 10.

The recognizing/select circuit 70 receives the flag FL, and discriminatively recognizes the input color image data R1, G1, and B1 that is supplied from the input register 42 to the 3-dimensional DLUT color convertor 10, as the RGB color image signal, and produces a signal DS for transfer to the conversion table buffer 30. When the conversion table buffer 30 receives the signal DS, the conversion data T10 for converting the RGB input color image signal into the color components data of the YMCK output color image signal, is supplied from the conversion table buffer 30 to the conversion table 20.

The conversion data T10 consists of conversion data T11, T12, T13 and T14 for converting the RGB color image signal into the yellow, magenta, cyan and black color components data of the YMCK output color image signal. The conversion data T11, T12, T13 and T14 are respectively stored in the address locations A1, A2, A3 and A4 in the conversion table 20, as shown in FIG. 6.

Figure 7A:
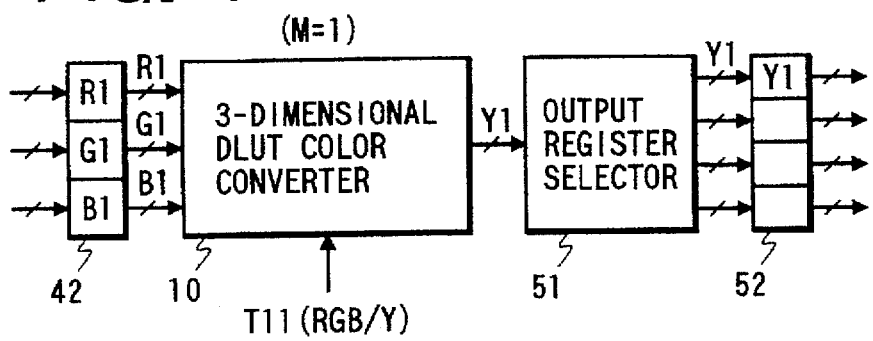
FIG. 7A–7D are a series of block diagrams useful in explaining the operation of the image processing apparatus of FIG. 1.

During the first period (M (repetition order)=1) of the conversion clock signal DL of the frequency 4 fr, which is within one period of the transfer clock signal IB of the frequency fr or the latch pulse IR of the frequency fr, the signal TS is applied to the conversion table 20. The address location A1 of the conversion table 20 is specified, and the conversion data T11 is read out from the address location A1 and transferred to the 3-dimensional DLUT color convertor 10 (FIG. 7(A)). The conversion data T11 is for converting the RGB color image signal into the yellow color component data of the YMCK output color image signal. In the 3-dimensional DLUT color convertor 10, the input color image data R1, G1, and B1 of the first pixel outputted from the input register 42 are converted into the yellow color component data Y1 of the YMCK output color image signal on the basis of the conversion data T11.

During the period of M=1 of the conversion clock signal DL, the output register selector 51 receives the register select signal RS to select the first-order address of the output register 52. The yellow output image data Y1 of the first pixel is loaded into the location of the first-order address of the output register 52, and is latched therein by the latch pulse OR of the frequency 4 fr.

Figure 7B:
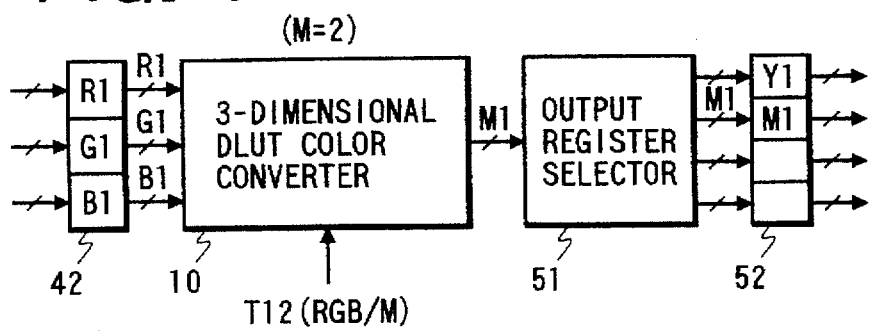

Also during one period of M=2 of the conversion clock signal DL during the next period of the transfer clock signal IB or the latch pulse IR, the input color image data R1, G1, and B1 of the first pixel are held in the input register 42 and inputted into the 3-dimensional DLUT color convertor 10 (FIG. 7B).

During the period of M=2, the conversion data T12 for converting the RGB color image signal into the magenta color component data of the YMCK output color image signal is transferred from the address location A2 of the conversion table 20 to the 3-dimensional DLUT color convertor 10 when the conversion table 20 receives the signal TS (FIG. 7B). The 3-dimensional DLUT color convertor 10 converts the input color image data R1, G1, and B1 of the first pixel that is outputted from the input register 42, into the magenta color component data M1 of the YMCK output color image signal, on the basis of the conversion data T12.

During the period of M=2 of the conversion clock signal DL, the output register selector 51 receives the register select signal RS to select the second-order address of the output register 52. The magenta output image data M1 of the first pixel is loaded into the location of the second-order address of the output register 52, and is latched therein by the latch pulse OR.

Figure 7C:
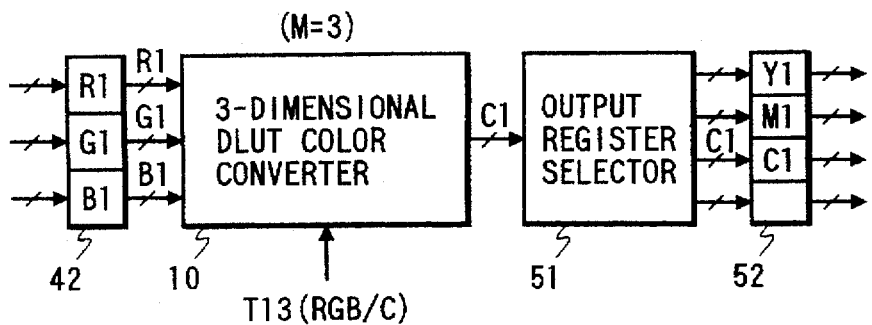

Also during one period of M=3 of the conversion clock signal DL during the next period of the transfer clock signal IB or the latch pulse IR, the input color image data R1, G1, and B1 of the first pixel are held in the input register 42 and inputted into the 3-dimensional DLUT color convertor 10 (FIG. 7C).

During the period of M=3, the conversion data T13 for converting the RGB color image signal into the cyan color component data of the YMCK output color image signal is transferred from the address location A3 of the conversion table 20 to the 3-dimensional DLUT color convertor 10 when the conversion table 20 receives the signal TS (FIG. 7C). The 3-dimensional DLUT color convertor 10 converts the input color image data R1, G1, and B1 of the first pixel that is outputted from the input register 42, into the cyan color component data C1 of the YMCK output color image signal, on the basis of the conversion data T13.

During the period of M=3 of the conversion clock signal DL, the output register selector 51 receives the register select signal RS to select the third-order address of the output register 52. The cyan output image data C1 of the first pixel is loaded into the location of the third-order address of the output register 52, and is latched therein by the latch pulse OR.

Figure 7D:
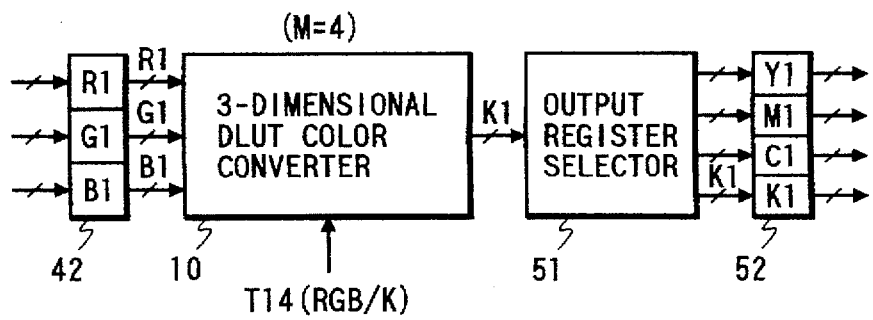

Also during one period of M=4 of the conversion clock signal DL during the next period of the transfer clock signal IB or the latch pulse IR, the input color image data R1, G1, and B1 of the first pixel are held in the input register 42 and inputted into the 3-dimensional DLUT color convertor 10 (FIG. 7D).

During the period of M=4, the conversion data T14 for converting the RGB color image signal into the black color component data of the YMCK output color image signal is transferred from the address location A4 of the conversion table 20 to the 3-dimensional DLUT color convertor 10 when the conversion table 20 receives the signal TS FIG. 7D). The 3-dimensional DLUT color convertor 10 converts the input color image data R1, G1, and B1 of the first pixel that is outputted from the input register 42, into the cyan color component data K1 of the YMCK output color image signal, on the basis of the conversion data T14.

During the period of M=4 of the conversion clock signal DL, the output register selector 51 receives the register select signal RS to select the fourth-order address of the output register 52. The black output image data K1 of the first pixel is loaded into the location of the fourth-order address of the output register 52, and is latched therein by the latch pulse OR.

Figure 8:
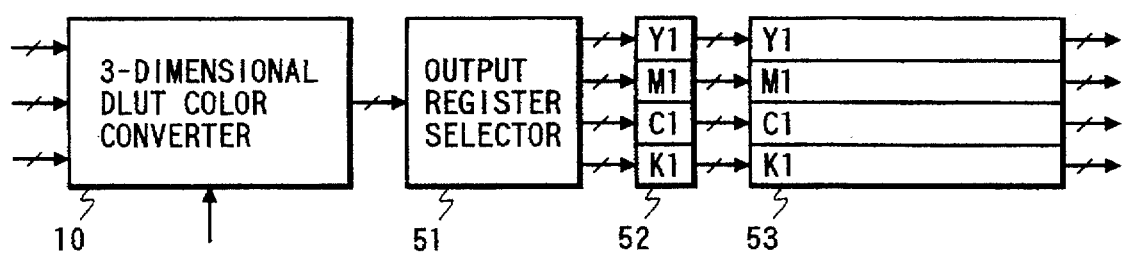
FIG. 8 is a further block diagram useful in explaining the operation of the image processing apparatus of FIG. 1.

In this way, the output image data Y1, M1, C1 and K1 of yellow, magenta, cyan and black of the first pixel have been latched in the output register 52. Then, the transfer clock OB of the frequency fr is applied to the output buffer memory 53, so that the output image data Y1, M1, C1 and K1 of the first pixel are transferred from the output register 52 to the output buffer memory 53, and stored therein (FIG. 8).

Figure 9:
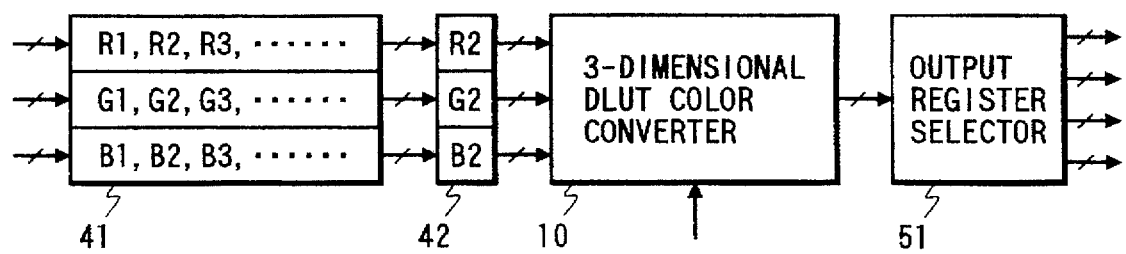
FIG. 9 is an additional block diagram useful in explaining the operation of the image processing apparatus of FIG. 1.

The input color image data R2, G2, and B2 of the second pixel are transferred from the input buffer memory 41 to the input register 42 when the input buffer memory 41 receives the transfer clock signal IB of the frequency fr. Then, the input color image data R2, G2, and B2 of the second pixel are latched in the high-order address, the medium-order address, and the lower-order address of the input register 42 by the latch pulse IR of the frequency fr, as shown in FIG. 9. Subsequently, the input color image data R2, G2, and B2 thus latched are inputted to the 3-dimensional DLUT color convertor 10.

Since the input color image data R2, G2, and B2 of the second pixel are the RGB color image signal, the conversion data T10 for converting the RGB input color image signal into the color components data of the YMCK output color image signal, is transferred from the conversion table buffer 30 to the conversion table 20, as in the case of the input color image data R1, G1, and B1 of the first pixel.

Accordingly, as in the case of the input color image data R1, G1, and B1 of the first pixel, the input color image data R2, G2, and B2 of the second pixel are successively converted into output image data Y2, M2, C2 and K2 of yellow, magenta, cyan and black of the second pixel in a time-divisional manner, during the periods of M=1, 2, 3, and 4 of the conversion clock signal DL, which are within one period of the transfer clock signal IB or the latch pulse IR. The same thing is correspondingly applied to the image data of one page where the input color image signal is the RGB color image signal.

Figure 10:
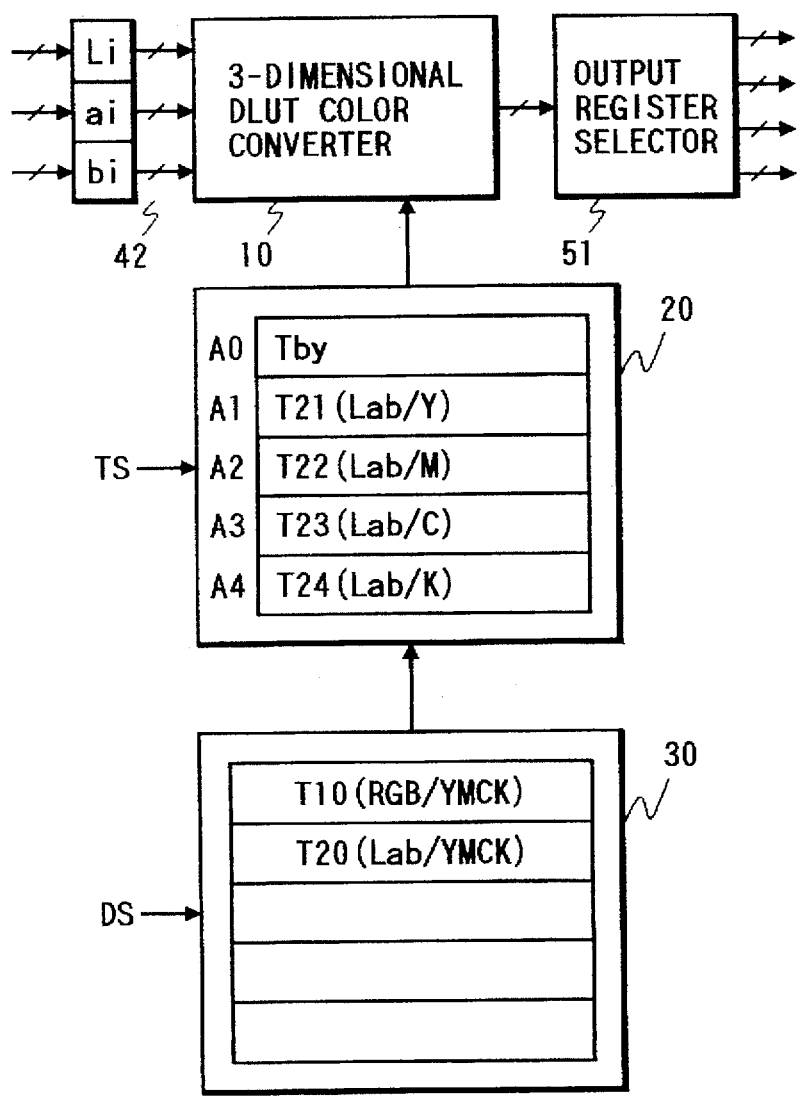
FIG. 10 is a block diagram useful in explaining the operation of the image processing apparatus of FIG. 1.

For the second half of the first line where the input color image signal is a Lab color image signal, the input color image data Li, ai, and bi of the first pixel in the second half of the first line is transferred from the input buffer memory 41 to the input register 42, when the input buffer memory 41 receives the transfer clock signal IB. Then, the input color image data Li, ai, and bi of the first pixel are latched in the high-order address, the medium-order address, and the lower-order address of the input register 42 when the input register 42 receives the latch pulse IR of the frequency fr, as shown in FIG. 10. Subsequently, the input color image data Li, ai, and bi thus latched are inputted to the 3-dimensional DLUT color convertor 10. Then, the conversion data T20 for converting the Lab input color image signal into the color components data of the YMCK output color image signal is transferred from the conversion table buffer 30 to the conversion table 20.

The conversion data T20 consists of conversion data T21, T22, T23 and T24 for converting the Lab color image signal into the yellow, magenta, cyan and black color components data of the YMCK output color image signal. The conversion data T21, T22, T23 and T24 are respectively stored in the address locations A1, A2, A3 and A4 in the conversion table 20, as shown in FIG. 10.

Accordingly, as in the case where the input color image signal is the RGB color image signal, the input color image data Li, ai, and bi of the first pixel in the second half of the first line are successively converted into output image data Yi, Mi, Ci and Ki of yellow, magenta, cyan and black of the first pixel in the second half of the first line in a time-divisional manner, during the periods of M=1, 2, 3, and 4 of the conversion clock signal DL, which are within one period of the transfer clock signal IB or the latch pulse IR. The same thing is correspondingly applied to the image data of one page where the input color image signal is the Lab color image signal.

For the image data in the memory area E1 (FIG. 5) where the input color image signal is the YMC color image signal, yellow, magenta and cyan input color image data of one pixel are transferred from the input buffer memory 41 to the input register 42, and latched in the high-order address, the medium-order address, and the lower-order address of the input register 42, and then transferred to the 3-dimensional DLUT color convertor 10. The recognizing/select circuit 70 produces a signal BY for transfer to the timing controller 60. In turn, the number-of-repetitions setting circuit 61 of the timing controller 60 produces a signal TS for transfer to the conversion table 20. The signal TS specifies the address location A0 in the conversion table 20, to thereby select the data Tby, which causes the input color image signal to be outputted as an output color image signal without color conversion.

The data Tby, which causes the input color image signal to be outputted as an output color image signal without color conversion, consists of data TbyY, data TbyM, data TbyC, and data TbyK (not illustrated). The data TbyY is used for correcting the yellow color component data of the YMC color image signal to that of the YMCK output color image signal. The data TbyM is used for correcting the magenta color component data of the YMC color image signal to that of the YMCK output color image signal. The data TbyC is used for correcting the cyan color component data of the YMC color image signal to that of the YMCK output color image signal. The data TbyK is used for correcting the yellow, magenta, and cyan color component data of the YMC color image signal to the black color component data of the YMCK output color image signal. The data TbyY, TbyM, TbyC, and TbyK are successively transferred to the 3-dimensional DLUT color convertor 10 during the periods of M=1, 2, 3, and 4 of the conversion clock signal DL, which are within one period of the transfer clock signal IB or the latch pulse IR.

Accordingly, the 3-dimensional DLUT color convertor 10 successively produces the yellow, magenta, cyan, and black color components data of one pixel, which are formed on the basis of the YMC color image signal of one pixel, in a time-divisional manner, during the periods of M=1, 2, 3, and 4 of the conversion clock signal DL.

Figure 11:
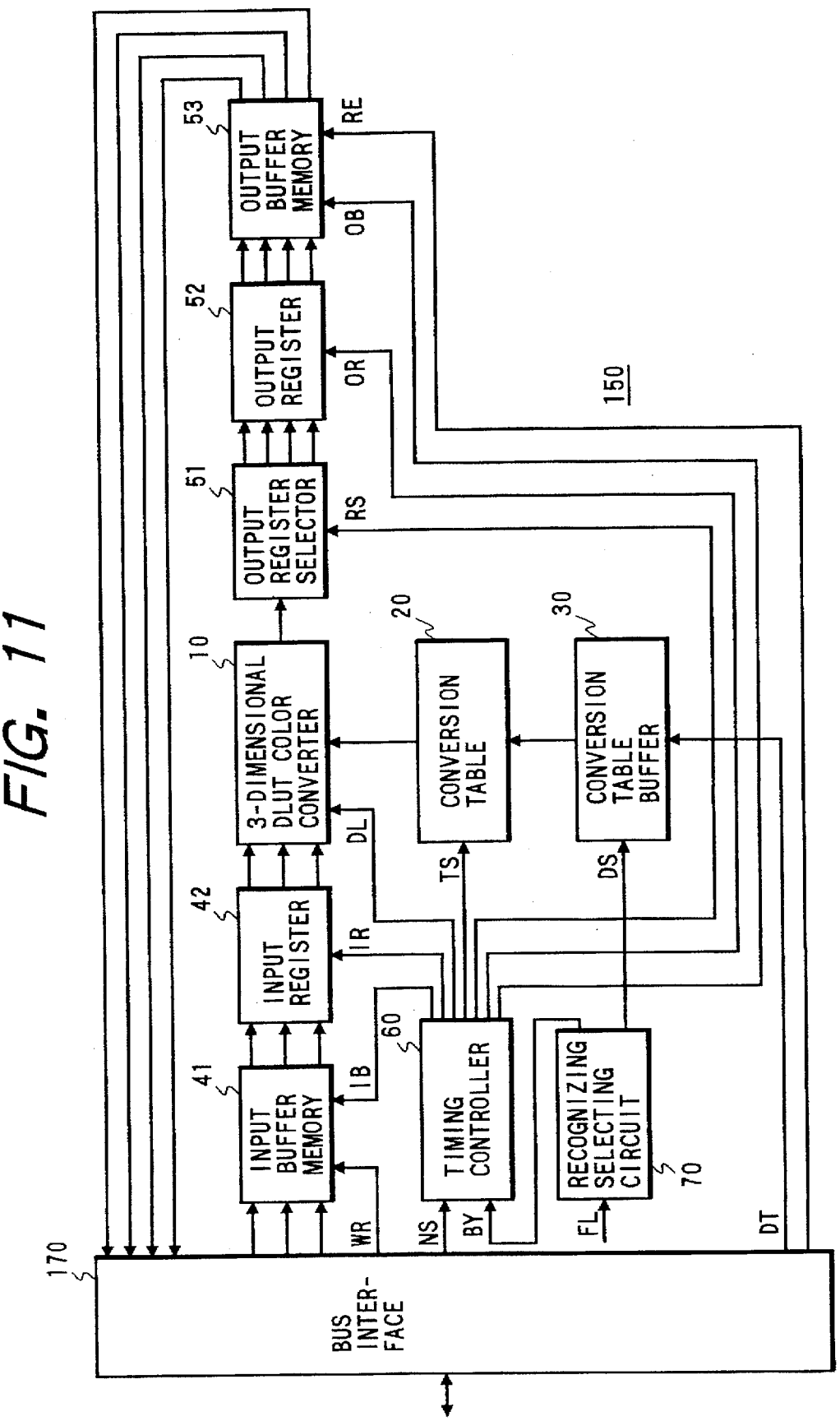
FIG. 11 is a block diagram showing another image processing apparatus according to the present invention.
Figure 12:
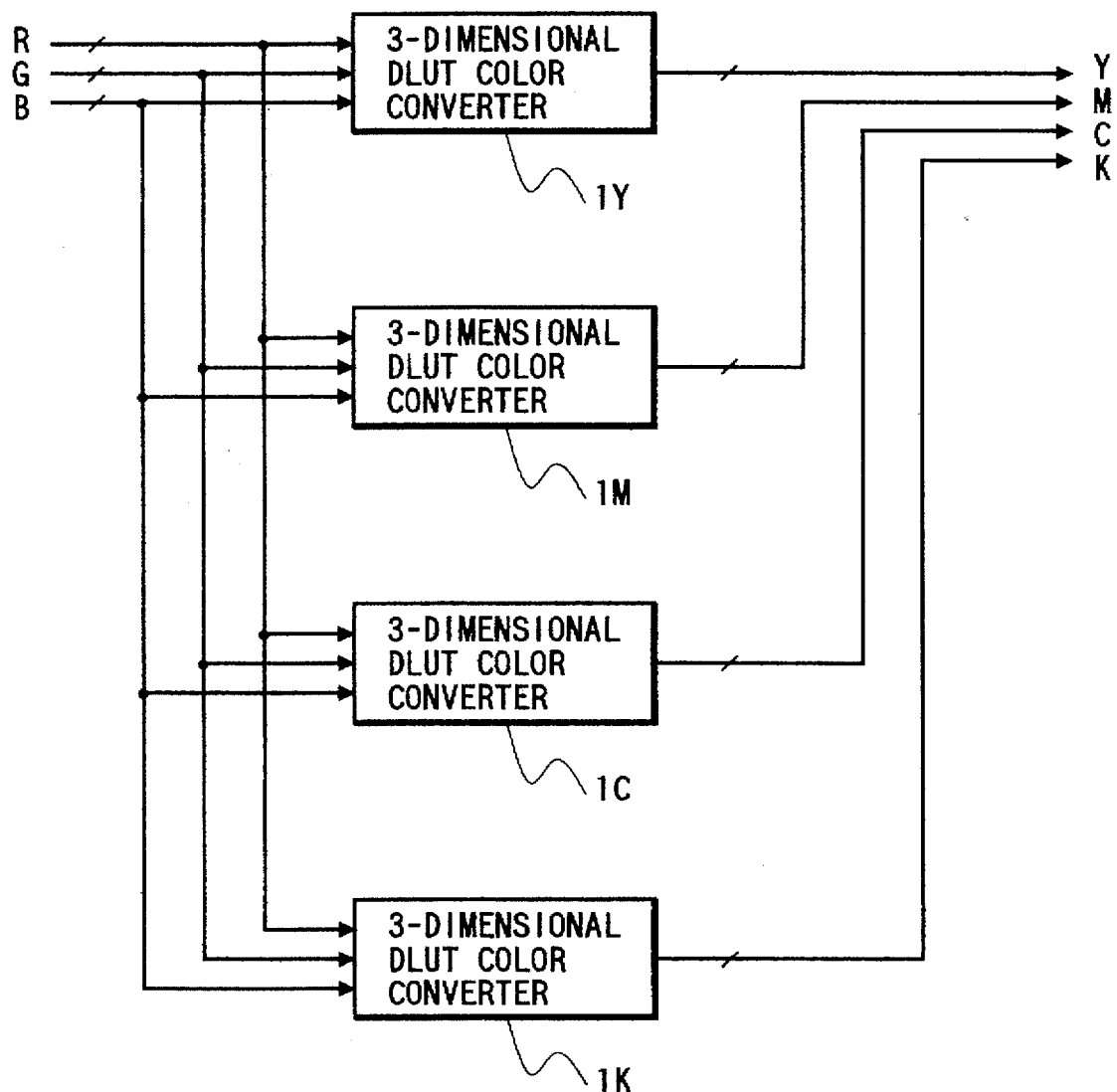
FIG. 12 is a block diagram showing a conventional image processing apparatus for color conversion.

FIG. 11 shows an arrangement of another image processing apparatus according to the present invention. In the image processing apparatus, data is transferred through a bus-interface 170.

To transfer image data, there is required a high speed data bus of which the data transfer rate is high enough to transfer the image data. In this connection, there is known a data transfer standard, called SBUS, specified by Sun Microsystems Inc. SBUS specifies a synchronous 64-bit data bus capable of transferring data at 25 MHz. The data transfer unit is optional. Where the data transfer unit of 128 bytes and 32 bits in width, for example, is used, the operation of writing data into the input buffer memory, inclusive of the cycle for the virtual address conversion, the physical addressing, data transfer, and the end process, is completed within 36 cycles. Data is transferred from the output buffer memory 53 to the main storage device 130 also within 36 cycles.

Even if such a high speed data bus is used, an efficient data conversion can be realized by such a control, based on the direct data transfer system, that the input and the output are alternately repeated.

In this embodiment, input color image signals of many color spaces can be converted into YMCK output color image signals in real time, viz., synchronously with the input and output timings of the color image signal, by using a single 3-dimensional DLUT color convertor 10.

In the embodiment, the input color image signal of one pixel is held in the input register 42 till the input color image signal of one pixel is successively converted into the color components data of the output color image signal of one pixel. Therefore, there is no need of such an operation that every time the input color image signal of one pixel is converted into the data of the color components of the output color image signal of one pixel, the same input color image signal of one pixel is transferred from the input buffer memory 41 to the 3-dimensional DLUT color convertor 10.

Additionally, also when the input color image signal is a YMC color image signal or contains the same, YMCK output color image signals can be obtained in real time, viz., the input and output timings of the color image signal are synchronous, as in the above case.

The data Tby, which causes the input color image signal to be outputted as an output color image signal without color conversion, in the present embodiment, causes the YMC color image signal to be outputted as the YMCK output color image signal, is transferred from the auxiliary storage device 140 to the main storage device 130, and from the conversion table buffer 30 to the conversion table 20, as the conversion data T10 and T20 for converting the RGB input color image signal, the Lab color image signal, and the like into the color components data of the YMCK output color image signal are so done.

Another process to obtain the final YMCK output color image signal as the output color image signal, as given below, is allowed. In this process, the 3-dimensional DLUT color convertor 10 produces a YMC color image signal, and a subsequent stage of the signal processing converts the YMCK output color image signal into a YMCK output color image signal. In this case, the number N of repetitions is "3".

It will be understood that the present invention is applicable for a copying machine, for example, in which an input color image signal of specific color spaces, e.g., an RGB input color image signal, is converted into an output color image signal of other specific color spaces, e.g., a YMC color image signal or a YMCK output color image signal. In this case, the conversion table buffer 30 is omissible.

As seen from the foregoing description, the present invention enables a single color converting means to convert an input color image signal of a color space into an output color image signal of another color space in real time, and to convert input color image signals of many color into output color image signals of other color spaces also in real time.

In the image processing apparatus, the frequency of the conversion clock signal is the result of multiplying the frequency of the reference clock signal by the number of the color components of the second color space. Further, the data of the register is converted, every conversion clock signal, into the color components of the output color image signal while the input color image signal of one pixel is successively stored into the register in synchronism with the reference clock signal. Therefore, by using one look-up table, the color conversion can be carried out in real time, viz., synchronously with the input and output timings of the color image signal.

Further, the color components of the output color image signal are formed for the same color image signal of one pixel that is stored in the register, on the basis of various conversion data. The number of operations of loading image data into the register is remarkably reduced, when comparing with the case where the data of several pixels are successively stored in the register for one conversion data, and one color component of the output color image signal is formed successively for several pixels. Therefore, even in such a case where a long time is taken for the image data to be loaded into the register, the time of the whole color conversion process can be relatively reduced.

Further, the output color image signal of which the color conversion is completed can be produced in successive order. Therefore, the output color image signal processed for color conversion can be outputted every pixel to an output device, if it is coupled with the output device.

What is claimed is:

1. An image processing apparatus which converts an input color image signal of a color space into an output color image signal of another color space, and outputs the converted color image signal, said image processing apparatus comprising:
   a conversion table for storing conversion data for converting the input color image signal into color component data of the output color image signal, a color conversion data set being generated for each color component of the output color image signal;
   conversion data select means for repeatedly selecting one color conversion data set from among the color conversion data sets generated for each color component of the output color image signal and reading the selected color conversion data sets from the conversion table in successive order; and
   color conversion means for converting the input color image signal into the output color image signal on the basis of the color conversion data set selected by said conversion data select means.

2. The image processing apparatus according to claim 1, further comprising: data holding means for holding the unit quantity of the data of the input color image signal until the unit quantity of the data of the input color image signal is converted into the unit quantity of the color component data of the output color image signal.

3. The image processing apparatus according to claim 1, further comprising:
   conversion data storage means for storing the conversion data that depend on the type of the color space of the input color image signal; and
   recognizing/select means for discriminatively recognizing the type of the color space of the input color image signal, and selecting the conversion data corresponding to the recognized type of the color space of the input color image signal from among those conversion data stored in the conversion data storage means, and transferring the conversion data to the conversion table.

4. The image processing apparatus according to claim 1, wherein one of the conversion table and the conversion data storage means stores both data which causes the input color image signal to be outputted as an output color image signal without color conversion and the conversion data.

5. An image processing apparatus for converting an input color image signal containing a plural number of color components, which define a first color space into an output color image signal containing a plural number of other color components, which define a second color space, the image processing apparatus comprising:
   a) reference clock generating means for generating a reference clock signal to transfer the input color image signal and the output color image signal pixel by pixel;
   b) conversion clock generating means for generating a conversion clock signal, which is synchronized with the reference clock signal and has a frequency as the result of multiplying the frequency of the reference clock signal by the number of the color components of the second color space;
   c) an input memory for storing a plural number of pixels of the input color image signal in synchronism with the reference clock signal;
   d) a register for storing, in synchronism with the reference clock signal, each of the color components of the first color space, which are contained in a signal of one pixel of the input color image signal that is stored in the input memory;
   e) a conversion table for storing a plural number of conversion data sets used for converting the input color image signal into the color components of the output color image signal;
   f) means for selecting, every conversion clock signal, a conversion data set from among the plural conversion data sets stored in the conversion table on the basis of the first color space of the input color image signal that is stored in the register and the color component of the output color image signal;
   g) color conversion means for converting, every conversion clock signal, each of the color components of the first color space that are stored in the register into one color component of the second color space, on the basis of the selected conversion data set; and
   h) an output memory for storing the converted output color image signal outputted from the color conversion means in synchronism with the reference clock signal.

6. The image processing apparatus according to claim 5, wherein the color conversion means is a look-up table containing the color components.

7. The image processing apparatus according to claim 5, further comprising: an image output unit for outputting the output color image signal, wherein the input color image signal stored in the input memory is transferred every pixel to the image output unit.

8. The image processing apparatus according to claim 5, further comprising:
   a network for transmitting an input color image signal; and
   a host machine for the network;
wherein an input color image signal transmitted through the network from the host machine is stored into the input memory.

9. The image processing apparatus according to claim 5, further comprising:
   image printing instruction means having color space of the input color image signal for each picture element;
   recognizing/selecting means for preparing said conversion data in said conversion table in accordance with the color space of the input color image signal for each picture element which is contained in an instruction from the recognizing/selecting means.

10. An image processing method for converting an input color image signal containing a plural number of color components, which define a first color space into an output color image signal containing a plural number of other color components, which define a second color space, the image processing method comprising the steps of:
   generating a reference clock signal to transfer the input color image signal and the output color image signal pixel by pixel, and a converting clock signal, which is synchronized with the reference clock signal and has a frequency as the result of multiplying the frequency of the reference clock signal by the number of the color components of the second color space;

selecting, every conversion clock signal, a conversion data set from plural conversion data sets generated for each color component of the second color space for one pixel of the input color image signal transferred every reference clock signal on the basis of each of the color components of the first color space and one color component of the second color space; and converting, every conversion clock signal, each of the color components of the first color space into one color component of the second color space in accordance with the selected conversion data set.

* * * * *